United States Patent
Nguyen et al.

(10) Patent No.: US 8,780,801 B2
(45) Date of Patent: Jul. 15, 2014

(54) METHOD FOR AUTOMATICALLY CONFIGURING A NEIGHBOR CELL LIST FOR A BASE STATION IN A CELLULAR WIRELESS NETWORK

(75) Inventors: Van Minh Nguyen, Le-Kremlin-Bicetre (FR); Holger Claussen, Straffan (IE)

(73) Assignee: Alcatel Lucent, Paris (FR)

( * ) Notice: Subject to any disclaimer, the term of this patent is extended or adjusted under 35 U.S.C. 154(b) by 262 days.

(21) Appl. No.: 13/142,103

(22) PCT Filed: Dec. 21, 2009

(86) PCT No.: PCT/EP2009/009204
§ 371 (c)(1),
(2), (4) Date: Sep. 15, 2011

(87) PCT Pub. No.: WO2010/075990
PCT Pub. Date: Jul. 8, 2010

(65) Prior Publication Data
US 2011/0317576 A1 Dec. 29, 2011

(30) Foreign Application Priority Data
Dec. 31, 2008 (EP) .................................... 08 291260

(51) Int. Cl.
*H04W 4/00* (2009.01)
(52) U.S. Cl.
USPC ......................................................... 370/328
(58) Field of Classification Search
USPC .................. 370/328–339, 350; 455/436–444
See application file for complete search history.

(56) References Cited

U.S. PATENT DOCUMENTS

| | | | | |
|---|---|---|---|---|
| 5,854,981 | A * | 12/1998 | Wallstedt et al. | 455/439 |
| 7,924,788 | B2 * | 4/2011 | Ore | 370/331 |
| 7,957,743 | B2 * | 6/2011 | Moe et al. | 455/439 |
| 8,081,981 | B2 * | 12/2011 | Kim | 455/439 |
| 2007/0213086 | A1 | 9/2007 | Claussen et al. | |

FOREIGN PATENT DOCUMENTS

| | | |
|---|---|---|
| CN | 1857021 A | 11/2006 |
| CN | 1901750 A | 1/2007 |
| CN | 101321355 A | 12/2008 |
| WO | WO2008/032154 A1 | 3/2008 |

OTHER PUBLICATIONS

Vodafone et al., "SON use-case: Automatic Neighbour Cell List Configuration," 3GPP TSG-RAN WG3 Meeting #57bis, R3-071957, XP050162741, pp. 1-4, Oct. 4, 2007.
International Search Report for PCT/EP2009/009204 dated Mar. 15, 2010.

* cited by examiner

*Primary Examiner* — Frank Duong
(74) *Attorney, Agent, or Firm* — Fay Sharpe LLP

(57) ABSTRACT

A method for automatically configuring a neighbor cell list, NCL, for a base station in a cellular wireless network, comprises receiving measurement reports for neighbor cells from a plurality of mobile stations. The reports are grouped by the neighbor cell with which each is associated. Neighbor cells are selected for inclusion in the NCL depending on the number of reports in their respective group.

9 Claims, 3 Drawing Sheets

METHOD FOR AUTOMATICALLY CONFIGURING A NEIGHBOR CELL LIST FOR A BASE STATION IN A CELLULAR WIRELESS NETWORK

FIELD OF THE INVENTION

The present invention relates to a method for automatically configuring a neighbor cell list, NCL, for a base station in a cellular wireless network.

BACKGROUND

In a cellular network comprising a plurality of base stations, each base station has one or more associated cells. A mobile station in communication with a serving cell may to need to handover to a new target cell to maintain connectivity. In a handover procedure, such as when a user terminal moves from the coverage area of one cell to that of another, a new connection to the target cell is set up and the connection to the old cell may be released.

When handover is required, the mobile station measures the signal quality of a number of neighboring cells and this is used in selecting a suitable target cell. This measurement phase is referred to as scanning. To reduce the scanning time and battery consumption, the mobile station scans only neighboring cells included in a list that is defined and broadcast by the serving cell. This list is called neighbor cell list (NCL). A mobile station is handover-covered if there is at least one neighboring cell of the NCL that provides it with sufficiently good signal quality for it to handover to that neighboring cell if necessary. To enhance handover performance, and also to minimize the impact of scanning, the NCL must contain only sufficient neighboring cells such that any mobile needing to perform a handover from its serving cell is handover-covered.

Currently, in a UMTS network for example, the NCLs for the base stations are set up manually, for example, using field measurements, with the help of centralized offline planning tools. Allocation of scrambling codes is also manually implemented using planning tools. If the network is modified, for example if new base stations are deployed, it requires the procedures to be repeated.

US patent application US 2007/0213086 describes a method for automatically configuring an NCL for a base station. To initialize the NCL, the base station sends a cell information list (CIL) to a mobile station and requests measurement reports for those cells included in the list. The base station uses the reported measurements to determine which of the base stations included in the CIL should be included in the NCL for that base station. Subsequently, the NCL may be automatically updated by requesting new measurement reports from a mobile terminal and using the reports to modify the NCL if appropriate.

BRIEF SUMMARY

In a first aspect of the invention, a method for automatically configuring a neighbor cell list, NCL, for a base station in a cellular wireless network, comprises receiving measurement reports for neighbor cells from a plurality of mobile stations. The reports are grouped by the neighbor cell with which each is associated. Neighbor cells are selected for inclusion in the NCL depending on the number of reports in their respective groups.

Thus, mobile stations may discover and measure the neighboring cells and the NCL may be configured automatically. This may be more efficient, cheaper and flexible compared to the current manual approach. Automatic configuration may be performed when required, for example, to update the NCL if there have been any changes to the network, for example, when new base stations are deployed in an existing network and for decentralized ad-hoc network architectures. Also, automatic configuration of the NCL may be advantageous with the trend to smaller cell sizes, which will make manual configuration more onerous. Automatic configuration is also advantageous in areas that are difficult for a field engineer to access.

A method in accordance with the invention uses mobile stations for discovering and performing statistics from the real network. This allows autoconfiguration of the NCL and makes it possible to self-optimize and adapt to dynamic changes and evolution of the network during operation. A method in accordance with the invention also is able to deal with networks in which the number of necessary neighbors exceeds the available NCL list length and may be more suitable for macrocellular deployments compared to the proposal described in US patent application US 2007/0213086. A method in accordance with the invention enables an optimized NCL to be defined to enhance the success of the handover from the serving cell, while reducing the impact of scanning by minimizing the size of the NCL.

In a method in accordance with the invention, a report is included in a group only if the measurement exceeds a signal quality threshold. If a measurement does not meet the required threshold it is less likely that the cell will provide a suitable target cell for handover and thus it can be discarded from further consideration. When a measurement exceeds the signal quality threshold, the mobile station that reported that measurement may be denoted as handover-covered.

In one method, the number of cells included in the NCL is determined by the percentage of mobile stations denoted as handover-covered compared to a threshold percentage.

From all the neighboring cells associated with their signal quality reported by mobile stations, those selected to be included in the NCL may be the ones that maximize the number of user measured locations at a macrocell boundary where at least one or more alternative neighbors are reported with a good enough signal quality to be a handover candidate. This ensures that at each location at the border of the macrocell, where its signal gets weaker, at least one alternative cell is available to be handed over to.

In a method in accordance with the invention, a report is included in a group only where the mobile station reporting that measurement report receives a signal from its serving cell that is below a quality threshold.

In a method in accordance with the invention, the reports are collected in a statistics module which orders them in a matrix of mobile station against related neighbor cells to form the reports in groups. Information from the statistics module may be used in configuring the NCL.

In a second aspect of the invention, a neighbor list, NCL, optimization system for use in a cellular wireless network comprises: a statistics module for collecting measurements from mobile stations and ordering them in a matrix by neighbor cell and mobile station; and a neighbor list calculation module for using information from the statistics module for selecting neighbor cells for inclusion in the NCL depending on the number of reports in each group associated with a neighbor cell.

In a third aspect of the invention a cellular wireless network includes a neighbor list, NCL, optimization system.

According to a fourth aspect of the invention, a cellular wireless network is arranged to implement a method in accordance with the first aspect. The cellular wireless network may be WiMAX, LTE, UMTS, or another technology type.

BRIEF DESCRIPTION OF THE DRAWINGS

Some embodiments of the present invention will now be described by way of example only, and with reference to the accompanying drawings, in which.

DETAILED DESCRIPTION

Figure 1:
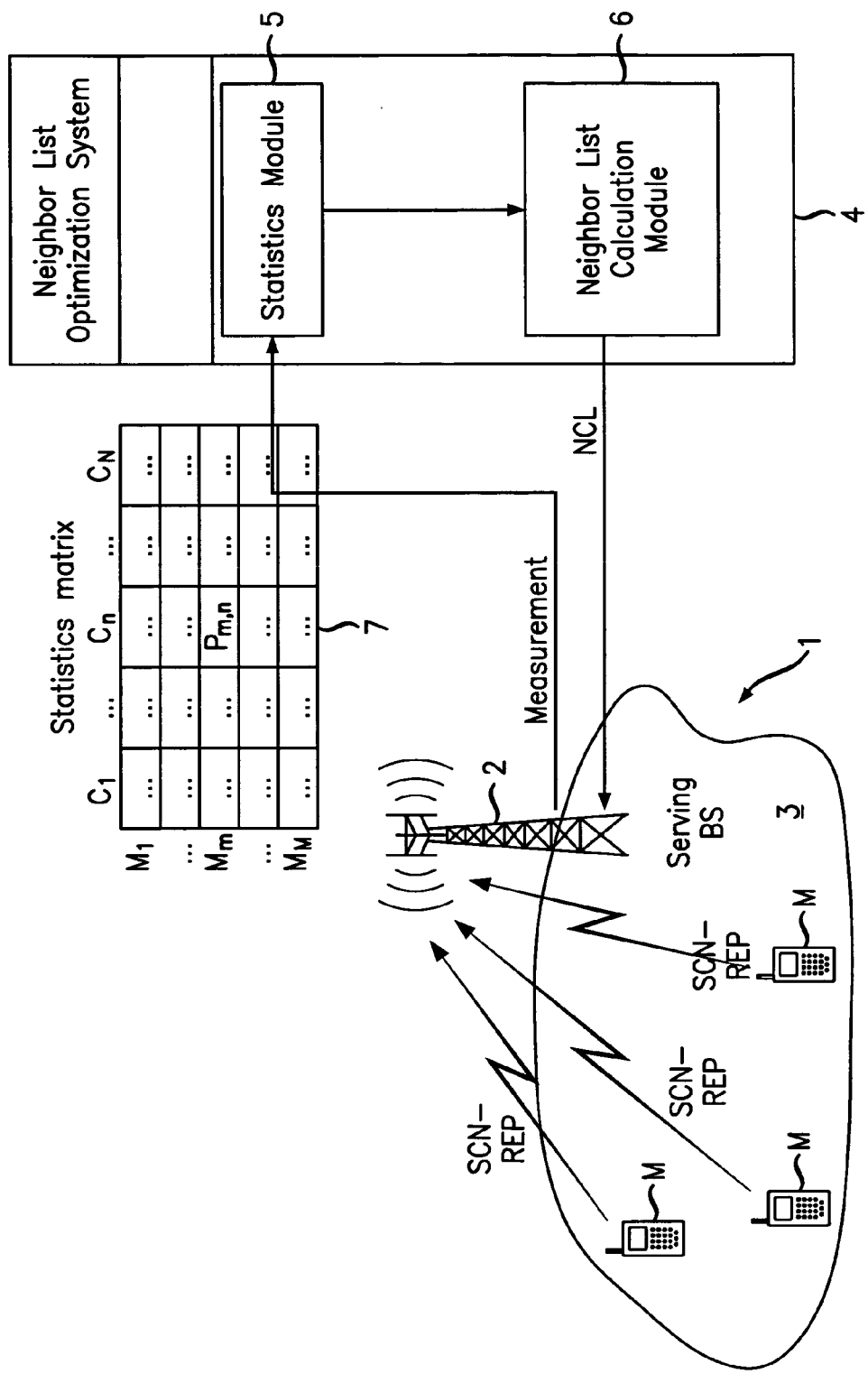
FIG. 1 schematically illustrates part of a cellular wireless network and a neighbor list optimization system.
Figure 2:
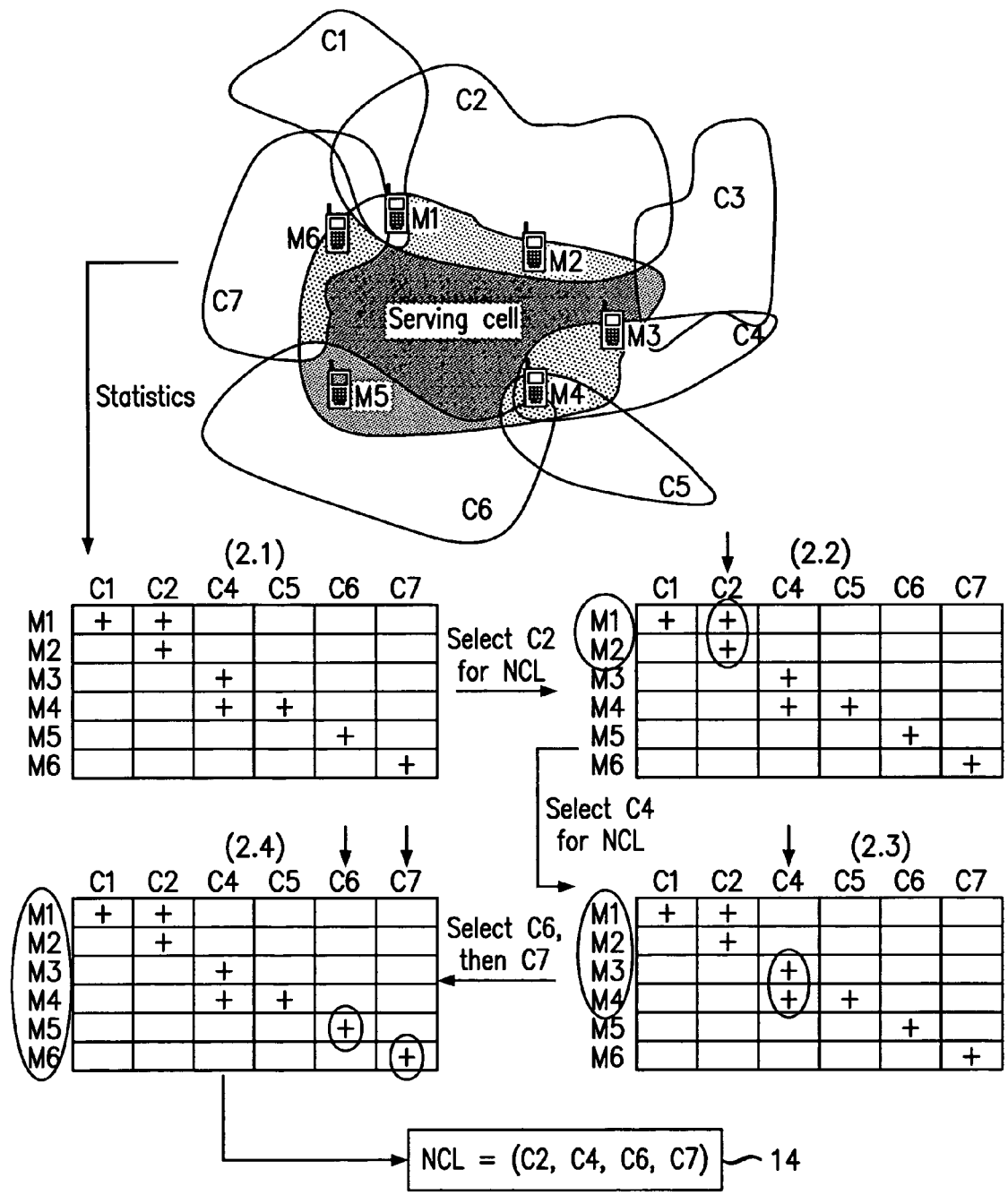
FIG. 2 schematically illustrates neighbor cells to the cell shown in FIG. 1.

With reference to FIG. 1, a WiMAX network 1 includes a plurality of base stations, one of which 2 is shown. The base station 2 has a cell 3 providing coverage shown by the shaded area around it. The cell 3 is the serving cell for a plurality of mobile stations M which send measurement reports to it concerning the signal quality received from neighbor cells. The mobile stations detect any neighbor cells having a sufficiently good quality signal, without the need for the base station to send information to the mobile stations regarding neighbor cell identities. FIG. 2 shows the serving cell 3 and a plurality of neighbor cells C1-C7 which border it. A number of mobile stations M1-M6 are located at boundaries between the serving cell 3 and neighbor cells C1-C7.

A neighbor list optimization system (NLOS) 4 includes a statistics module (SM) 5 and a neighbor list calculation module (NLCM) 6. The NLOS 6, or parts of it, may be located at the base station 2 or remote therefrom. The statistics module 5 collects measurement reports from mobile stations M1 to $M_M$. The measurement reports contain the identifier and signal quality of each neighboring cell discovered by a mobile station, and also the signal quality of the serving cell received by that mobile station. A mobile station measures neighboring cells during scanning so that, in addition to neighboring cells already included in a current NCL, it scans as many neighboring cells as possible that the mobile can capture. This allows each cell to discover newly appearing neighboring cells and also to be kept updated if others disappear. The mobile station reports these measurements to the serving cell 3 through SCN-REP message, for example.

From measurements coming from mobile stations, the SM 5 generates a statistics matrix 7 that includes neighboring cells C1 to CN with their signal quality measured by different mobile stations M1 to $M_M$. To enhance efficiency, the statistics matrix 7 only includes measurement reports from mobile stations that receive a signal quality from the serving cell that is worse than an acceptable threshold. This ensures that only locations where mobile stations might require a handover, for example, at the macrocell edge, are taken into account.

Figure 3:
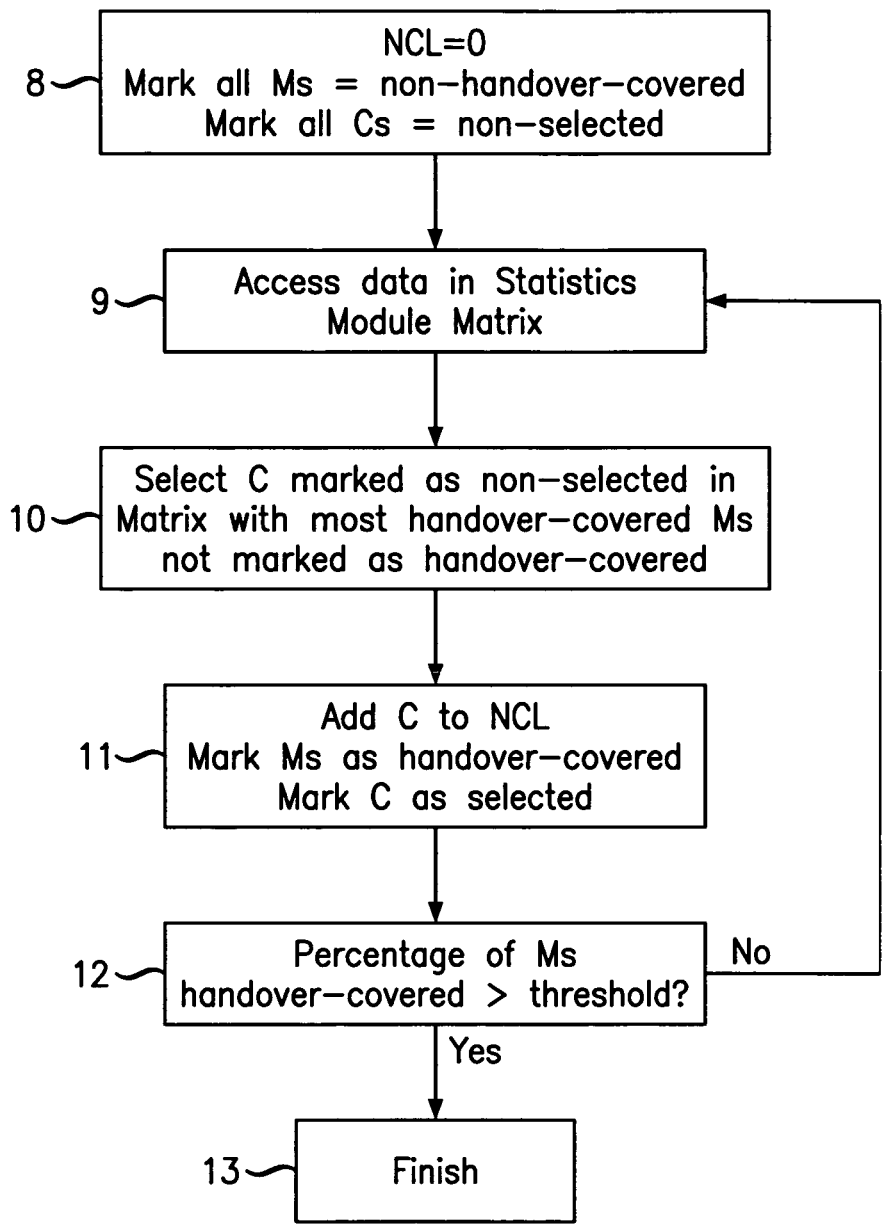
FIG. 3 schematically illustrates steps in a method in accordance with the invention.

The NLCM 6 uses the statistics matrix 7 provided by the SM 5 to compute the optimal NCL. One method in which this is carried out is now described, with reference to FIG. 3.

Initially, at 8, the NCL is empty and all the mobile stations are marked as 'non handover-covered' and all cells are marked as 'not selected'.

In the next step 9, data set out in the statistics matrix 7 is accessed.

At step 10, the neighboring cell that is marked as not selected and that that has the largest number of mobile stations receiving a good enough signal quality from it is selected to be included in the NCL. In FIG. 2, a good enough signal quality is marked by a plus "+" sign. The mobile stations receiving a sufficiently good signal quality from the selected neighboring cell are marked as 'handover-covered' at 11. The cell is marked as selected and added to the NCL.

The steps are repeated until, at 12, an acceptable percentage of the mobile stations are handover-covered and the calculation finishes at 13. At some later time, the method may be carried out again to provide an updated NCL.

The process is further described with reference to FIG. 2. In (2.1) the statistics matrix is shown for mobile stations M1 to M6 and cells C1 to C7.

In (2.2) of FIG. 2, the cell C2 is selected as it has more reports in its group than other cells and mobiles M1, M2 become handover-covered.

After the step (2.2), mobiles M3, M4, M5, and M6 are still non handover-covered. Considering the remaining cells C1, C4, C5, C6, and C7, the cell C4 is the best one in regarding the number of remaining mobiles it covers. Thus, cell C4 is added into the NCL, and now mobiles M1, M2, M3, and M4 are handover-covered.

The steps are repeated until at least an acceptable percentage of the mobiles are handover-covered. For example in FIG. 2, after (2.3) there are 67% (i.e., 2/3) of mobiles are ensured to find an acceptable handover target; and that is 100% after (2.4). The final NCL is shown at 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for automatically configuring a neighbor cell list, NCL, for a base station in a cellular wireless network, comprising:
   receiving measurement reports for neighbor cells from a plurality of mobile stations;
   grouping the reports by the neighbor cell with which each is associated;
   wherein the reports are collected in a statistics module which orders them in a matrix of mobile stations against related neighbor cells to form the reports in groups;
   using information from the statistics module in configuring the NCL by accessing the statistics module to determine the group with the most reports over a threshold quality from non-handover enabled mobile stations;
   denoting the mobile stations reporting said most reports as handover-covered and adding the cell with which that group is associated to the NCL;
   re-accessing the statistics module to determine a next group with the most reports over a threshold quality from non-handover enabled mobile stations; and,
   selecting neighbor cells for inclusion in the NCL depending on the number of reports in their respective groups.

2. The method as claimed in claim 1 wherein a report is included in a group only if the measurement exceeds a signal quality threshold.

3. The method as claimed in claim 2 wherein, when a measurement exceeds the signal quality threshold, the mobile station that reported that measurement is denoted as handover-covered.

4. The method as claimed in claim 3 and wherein the number of cells included in the NCL is determined by the percentage of mobile stations denoted as handover-covered compared to a threshold percentage.

5. The method as claimed in claim 1 and including a report in a group only where the mobile station reporting that measurement report receives a signal from its serving cell that is below a quality threshold.

6. The method as claimed in claim 1 and including updating the NCL at a time period after it has been configured to take into account changes in the network.

7. A neighbor list, NCL, optimization system comprising: a statistics module for collecting measurements from mobile stations and ordering them in a matrix by neighbor cell and mobile station; and
 a neighbor list calculation module for using information from the statistics module for selecting neighbor cells for inclusion in the NCL depending on the number of reports in each group associated with a neighbor cell by using information from the statistics module in configuring the NCL by accessing the statistics module to determine the group with the most reports over a threshold quality from non-handover enabled mobile stations; denoting the mobile stations reporting said most reports as handover-covered and adding the cell with which that group is associated to the NCL; and re-accessing the statistics module to determine a next group with the most reports over a threshold quality from non-handover enabled mobile stations.

8. The system of claim 7 further comprising a cellular wireless network including a plurality of base stations wherein the neighbor list is calculated by the neighbor list calculation module for at least one of the base stations of the plurality.

9. A cellular wireless network comprising:
 at least one processor configured to automatically configure a neighbor cell list, NCL, for a base station of the cellular wireless network by:
 receiving measurement reports for neighbor cells from a plurality of mobile stations;
 grouping the reports by the neighbor cell with which each is associated;
 wherein the reports are collected in a statistics module which orders them in a matrix of mobile stations against related neighbor cells to form the reports in groups;
 using information from the statistics module in configuring the NCL by accessing the statistics module to determine the group with the most reports over a threshold quality from non-handover enabled mobile stations;
 denoting the mobile stations reporting said most reports as handover-covered and adding the cell with which that group is associated to the NCL;
 re-accessing the statistics module to determine a next group with the most reports over a threshold quality from non-handover enabled mobile stations; and,
 selecting neighbor cells for inclusion in the NCL depending on the number of reports in their respective groups.

* * * * *